US 6,678,113 B2

(12) United States Patent
Feliss et al.

(10) Patent No.: US 6,678,113 B2
(45) Date of Patent: Jan. 13, 2004

(54) DEVICE AND METHOD FOR MONITORING LUBRICANT WITHIN A DISK DRIVE

(75) Inventors: Norbert A. Feliss, Sunnyvale, CA (US); Sylvia Lui Lee, San Jose, CA (US); Karl A. Flechsig, Los Gatos, CA (US); Donald Ray Gillis, San Jose, CA (US); Thomas A. Gregory, Campbell, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 358 days.

(21) Appl. No.: 09/812,017

(22) Filed: Mar. 19, 2001

(65) Prior Publication Data

US 2002/0131192 A1 Sep. 19, 2002

(51) Int. Cl.$^7$ ................................................ G11B 33/14
(52) U.S. Cl. ................................ 360/97.02; 360/97.01; 360/98.02; 360/77.03; 360/60; 360/69
(58) Field of Search ............................... 340/682, 603; 360/75, 69, 254.7, 254.8, 97.02, 98.02, 71, 77.03, 98.07, 234.1, 97.01; 324/71.1

(56) References Cited

U.S. PATENT DOCUMENTS

| | | | |
|---|---|---|---|
| 3,903,478 A | * | 9/1975 | Stuart et al. ............... 324/663 |
| 4,728,943 A | * | 3/1988 | Vermeiren ................. 340/682 |
| 5,134,379 A | | 7/1992 | Maher et al. |
| 5,135,772 A | | 8/1992 | Garrison |
| 5,229,899 A | | 7/1993 | Brown et al. |
| 5,309,301 A | * | 5/1994 | Gregory et al. ............ 360/137 |
| 5,396,383 A | * | 3/1995 | Gregory et al. ........... 360/97.02 |
| 5,543,983 A | * | 8/1996 | Gregory et al. ........... 360/97.02 |
| 5,742,449 A | * | 4/1998 | Gregory et al. ........... 360/97.02 |
| 6,246,534 B1 | * | 6/2001 | Gillis et al. ................. 360/75 |

FOREIGN PATENT DOCUMENTS

| | | |
|---|---|---|
| JP | 60-43256 | 3/1985 |
| JP | 64-73581 | 3/1989 |
| JP | 2-37589 | 2/1990 |
| JP | 3-147590 | 6/1991 |
| JP | 3-229979 | 10/1991 |
| JP | 4-195792 | 7/1992 |
| JP | 4-319594 | 11/1992 |
| JP | 8045260 | 2/1996 |
| JP | 9282601 | 10/1997 |

OTHER PUBLICATIONS

IBM Technical Disclosure Bulletin. "Liquid Level Detector" Vol. 16, No. 3. P. 775. Aug. 1973.

* cited by examiner

Primary Examiner—David Hudspeth
Assistant Examiner—Natalia Figueroa
(74) Attorney, Agent, or Firm—John L. Rogitz

(57) ABSTRACT

A device for monitoring lubricant within a disk drive includes a reservoir packet impregnated with lubricant. The reservoir packet is disposed between a first metal screen and a second metal screen such that a lubricant reservoir transducer is created. The capacitance of the lubricant reservoir packet is monitored and when it falls below a predetermined percentage of the initial capacitance, a user is warned to back up the files contained in the disk drive before failure due to lack of lubricant occurs.

24 Claims, 2 Drawing Sheets

DEVICE AND METHOD FOR MONITORING LUBRICANT WITHIN A DISK DRIVE

BACKGROUND OF THE INVENTION

1. Field of the Invention

The present invention relates generally to magnetic disk drive lubrication systems.

2. Description of the Related Art

Certain types of hard disk drives can include a lubricant reservoir packet that provides lubrication to the heads and disks within the hard disk drive continuously over the useful life of the hard disk drive. Typically, the geometry of the reservoir packet is a thin rectangular structure that is comprised of synthetic and/or natural fibers or a suitable foam or sponge-like medium contained in a particle-free woven fabric covering or other particle-free medium. The selected media must allow for containment of the lubricant and permit suitable airflow. The reservoir packet contains a specified quantity of volatile lubricant that is held therein by capillary interaction with the aforementioned fibers. Vapor from this lubricant source communicates with all of the heads and disks within the disk drive. The reservoir packet stores a specific volume of lubricant that is transferred to the heads and disks in order to keep them constantly lubricated so as to prevent premature failure of the disk drive.

Ordinarily, the reservoir packet includes a quantity of lubricant sufficient to last the entire lifetime of the disk drive. Unfortunately, in certain cases it is possible for the reservoir packet to prematurely run out of lubricant possibly resulting in premature failure of the drive. This may occur if the disk drive does not remain adequately sealed thereby resulting in excessive leakage of lubricant vapor from the disk drive enclosure. It may also be useful to assess field performance by monitoring reservoir quantity as a function of time and operational environment.

The present invention accordingly recognizes that there currently is a need for monitoring the lubricant in the reservoir packet and alerting the user when the reservoir packet is almost empty in order to allow the user the chance to backup the files contained in the disk drive before failure of the drive. In the case of extreme depletion, an option allows the drive to be turned off to prevent imminent failure preceding backup.

SUMMARY OF THE INVENTION

A disk drive includes at least one head, at least one disk and a lubricant reservoir packet that contains or incorporates an electrical transducer capable of monitoring the amount of lubricant remaining therein. The remaining lubricant is in vaporous communication with the head and disk. The disk drive also includes a controller that uses the transducer to measure an electrical characteristic associated with the lubricant reservoir packet and generates a signal when the remaining lubricant in the reservoir packet is nearly exhausted. The transducer may use a physical characteristic of the lubricant for the purpose of assessing the remaining amount. Suitable characteristics include the lubricant's dielectric constant, electrical conductivity, viscosity, surface tension, migration in an imposed electrical field, physical mass, or by other means.

In one embodiment, the electrical transducer can either be placed within the reservoir packet or close to the packet so as to sample only a small representative portion of the packet. Conversely, in an alternative embodiment, the transducer can encompass all or a substantial portion of the reservoir packet. An example of the first embodiment is a small crystal oscillator fitted with a narrow thin-film strip (micro-thread), all of which is surface-treated. The strip is physically intertwined with the fibers comprising the reservoir packet so that it communicates liquid lubricant via capillary flow with the oscillator to indicate the lubricant quantity remaining in the reservoir packet. Similarly, a micro device sensitive to either viscosity or surface tension can provide an assessment of the remaining liquid lubricant in the aforementioned reservoir packet. An example of the second case includes two parallel, electrically conductive plates placed on either side of the reservoir packet. The plates are designed and positioned to have a fixed, substantial contact with the reservoir packet and an electrically conductive lubricant thus allows the quantity of lubricant to be assessed via electrical conductivity (resistivity). Because most lubricants have a high dielectric constant, the quantity of lubricant can also be assessed by a similar arrangement of parallel plates by monitoring the capacitance of the system. To allow a pathway for molecules of the lubricant to vaporize from the reservoir packet into the drive's enclosure, one or more of the referenced parallel plates may contain a suitable array of small holes such that the physical measurement is not substantially affected. On the other hand, the plate(s) may be substituted by a suitable electrically conductive screen.

In a preferred embodiment, the electrical characteristic measured by the controller is the electrical capacitance of the lubricant reservoir packet after it is fitted with conductive plates. Preferably, the plates are established by first and second metal screens, and a reservoir packet containing a metered amount of lubricant is disposed between the screens which establishes a characteristic capacitance. The screens can be designed so as to allow airflow through the reservoir packet. As lubricant is consumed, the capacitance of the packet declines. Also in a preferred embodiment, the controller is connected to an output device that receives a signal when the lubricant reservoir packet is nearly empty of lubricant.

In another aspect of the present invention, a method for monitoring lubricant within a disk drive includes providing a lubricant reservoir packet and disposing a lubricant reservoir transducer proximal to the reservoir packet. Using the transducer, an electrical characteristic of the lubricant reservoir packet is measured.

In yet another aspect of the present invention, a method for monitoring lubricant within a disk drive includes measuring an electrical characteristic of a lubricant reservoir packet when it is empty and also after it has been filled with a metered quantity of lubricant thereby establishing the full range of the electrical characteristics. Then, it is determined when the electrical characteristic falls below a predetermined percentage of the initial value of the electric characteristic. When the electrical characteristic falls below the predetermined percentage of the initial value, a warning signal is generated. The drive can be automatically shut down if the user does not take action within a certain period of time after the warning signal is generated, or after the electrical characteristic indicates that a more critical depletion of the lubricant reservoir has occurred.

The present invention will now be described, by way of example, with reference to the accompanying drawings, in which:

DESCRIPTION OF AN EMBODIMENT OF THE INVENTION

Figure 1:
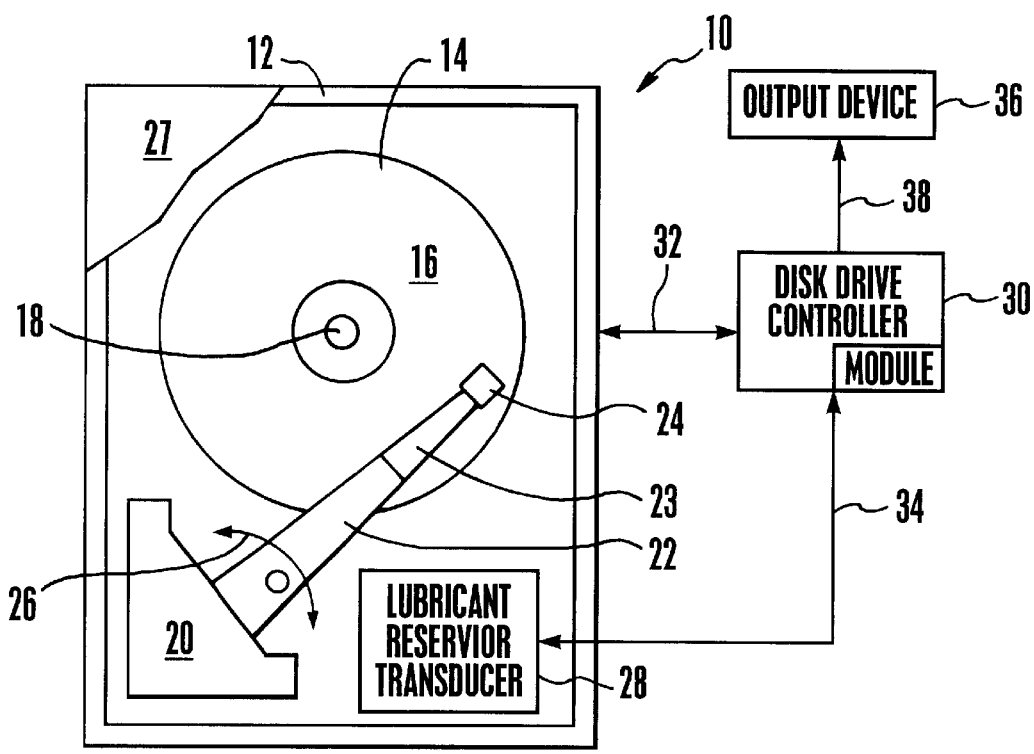
FIG. 1 is a block diagram of a disk drive control system in which the present invention can be embodied to monitor the lubrication within the disk drive with portions of the disk drive cut away for clarity.

Referring initially to FIG. 1, a disk drive is shown and generally designated 10. FIG. 1 shows that the disk drive 10 includes a preferably metal housing 12. Within the housing 12 is at least one disk 14 having a read/write surface 16. As shown in FIG. 1, the disk 14 is mounted on a spindle 18. Also within the housing 12 is an actuator 20 and extending from the actuator 20 is an actuator arm 22. A head suspension unit 23 extends from the actuator arm 22 and provides greater extension for a read/write head 24 attached thereto. When energized, the actuator 20 moves the actuator arm 22 back and forth, as indicated by arc 26, and causes the read/write head 24 to move over the read/write surface 16 of the disk 14. As shown in FIG. 1, the housing 12 includes a cover 27 that seals the housing 12 and protects the elements within the housing 12.

As shown in FIG. 1, a lubricant reservoir transducer 28 is in communication with the disk drive 10 such that bulk lubricant, described below, contained within the lubricant reservoir transducer 28 is provided to the disk 14 via the vapor-phase to maintain a lubricant film on the surface 16 and also on the mating surface of the head so as to ensure robust operation of the disk drive 10. FIG. 1 also shows a disk drive controller 30 electrically connected to the disk drive 10 via electrical line 32 and electrically connected to the lubricant reservoir transducer 28 via electrical line 34. As also shown in FIG. 1, an output device 36 is electrically connected to the disk drive controller 30 via electrical line 38. It is to be appreciated that the output device 36 is used to provide an audible or visual warning to a user when the lubricant, described below, in the lubricant reservoir transducer 28 nears empty. The output device 36 can also be used to provide a visual indication of the lubricant remaining in the lubricant reservoir transducer 28 in order to allow the user to monitor the lubricant. Accordingly, the output device 36 can be a computer monitor, printer, warning lamp, warning alarm, computer network, LED, LCD, or other appropriate device. In addition to providing a warning, an optional output command could result in an automatic shutdown of the disk drive 10 or an automatic backup of the disk drive 10, e.g., a full backup or partial backup. The backup can occur via a direct connection to another drive or via a computer network system, e.g., the Internet.

Figure 2:
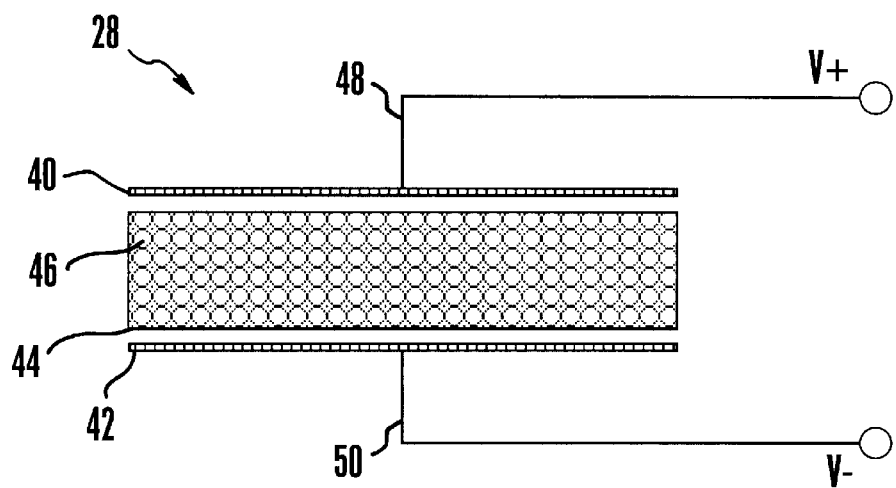
FIG. 2 is a cross-section view of a preferred embodiment of the lubricant reservoir transducer.

Referring to FIG. 2, the details of the lubricant reservoir transducer 28 can be seen. FIG. 2 shows that the lubricant reservoir transducer 28 includes a preferably metal first screen 40 and a preferably metal second screen 42. The screens 40, 42 establish capacitor plates while allowing airflow to enter through one screen 40, 42 and exit through the other screen 40, 42. Disposed there between is a preferably fibrous reservoir packet 44 that is impregnated with a suitably volatile lubricant 46. As shown in FIG. 2, a first electrical line 48 is connected to the first screen 40 and a second electrical line 50 is connected to the second screen 42.

It is to be appreciated that this combination of structure forms a capacitor having a capacitance that can be monitored to determine when the lubricant 46 is nearly depleted. Regarding the present invention it has been has discovered in an example that there is approximately a seven and a half percent (7.5%) change in capacitance between a fully depleted reservoir packet 44 and one that is full of lubricant 46. The controller 30 monitors the fluid 46 remaining within the lubricant reservoir transducer 28 by monitoring the capacitance of the lubricant reservoir transducer 28. Accordingly, when the controller 30 detects that the capacitance of the lubricant reservoir transducer 28 has dropped nearly seven percent (7.0%) from the capacitance of a full capacitor 28 (or other appropriate value), a signal can be sent to the output device 36 to warn the user that the lubricant 46 is nearly depleted. Thus, the user can backup crucial files before the lubricant 46 is fully depleted and the disk drive fails 10.

If the user fails to backup the files when signaled at the seven percent reduction in capacitance, the controller 30 can automatically shut down the disk drive 10 when the reduction in capacitance reaches seven and one-half percent (7.5%) to prevent catastrophic failure of the disk drive 10 and loss of information stored thereon. Or, in the alternative, the controller 30 can cause the disk drive 10 to be automatically backed up when the reduction in capacitance reaches the crucial seven and one-half percent (7.5%).

It is to be appreciated that the structure of the lubricant reservoir transducer 28 described above can be used to monitor the lubricant 46 remaining in the reservoir packet 44 by measuring and monitoring the electrical conductivity, or resistivity, of the lubricant 46.

Figure 3:
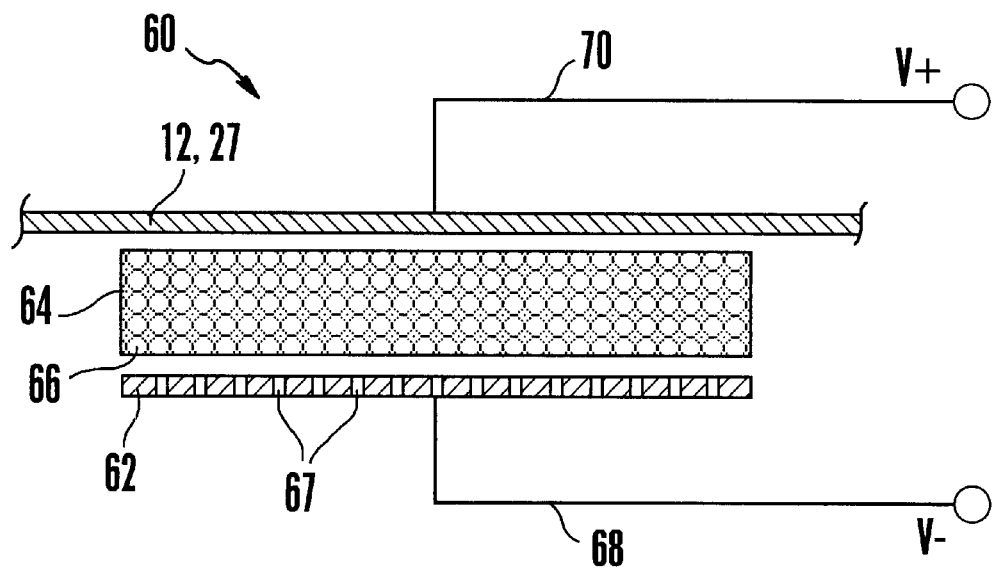
FIG. 3 is an alternative embodiment of the lubricant reservoir transducer.

Referring to FIG. 3, an alternative embodiment of the lubricant reservoir transducer is shown an generally designated 60. FIG. 3 shows that this lubricant reservoir transducer 60 includes a preferably metal plate 62 placed in close proximity to a portion of the housing 12, e.g., any side wall of the housing 12, the bottom of the housing 12, or the cover 27 of the housing 12. Disposed there between is a fibrous reservoir packet 64 that is impregnated with a suitably volatile lubricant 66. Thus, the plate 62 and the housing 12 form capacitor plates while allowing airflow to enter through one end of the reservoir packet 64, travel axially through the reservoir packet 64, and exit through the other end of the packet 64. FIG. 3 shows that the metal plate 62 is formed with a plurality of relatively small holes 67 through which lubricant vapor can pass so as to enhance the communication of lubricant vapor within the hard disk drive 10. It is to be appreciated that ends of pocket 62 may be blocked thereby utilizing only the plurality of relatively small holes 67 as the means of communicating lubricant vapor within the hard disk drive 10. Alternatively, a solid plate 62 would only allow airflow through the reservoir pocket 64 as a means of communicating lubricant vapor within the hard disk drive 10. As shown in FIG. 3, a first electrical line 68 is connected to the screen 62 and a second electrical line 70 is connected to the housing 12 or the cover 27. It is to be appreciated that this combination of structure forms a capacitor having a capacitance that can be monitored to determine when the lubricant 66 is nearly depleted.

Figure 4:
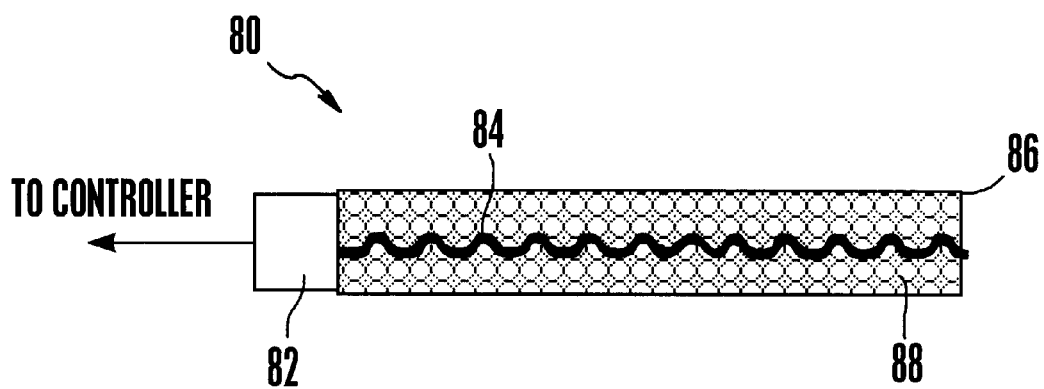
FIG. 4 is a second alternative embodiment of the lubricant reservoir transducer.

Now referring to FIG. 4, a second alternative embodiment of the lubricant reservoir transducer is shown and generally designated 80. FIG. 4 shows that this lubricant reservoir transducer 80 includes a small crystal oscillator 82 fitted with a narrow thin-film strip 84, e.g., a micro-thread. Additionally, the lubricant reservoir transducer 80 includes a fibrous reservoir packet 86 that is impregnated with a suitably volatile lubricant 88. The thin-film strip 84 is surface treated and then intertwined with the fibers of the reservoir packet 86 to communicate liquid lubricant 88 to the oscillator 82 via capillary flow along the thin-film strip 84. Thus, the quantity of lubricant 88 remaining in the reservoir packet 86 can be effectively monitored. The crystal oscillator 82 with its associated thin film strip 84 may be physically separated from the reservoir pocket 86. It is not essential for the thin-film strip 84 to be intertwined with the fibers of the reservoir pocket running the entire length of said pocket.

With the configuration of structure described above, it is to be appreciated that the device and method for monitoring lubricant within a disk drive of the present invention provides a means for safeguarding the data stored on a disk drive. Thus, when the lubricant is nearly depleted the user can be warned to back-up the data contained within the disk drive before a catastrophic failure occurs. Should the volatile lubricant become critically depleted and the warning signal is not heeded, an emergency option is provided to shut off the disk drive until service can be obtained or automatically backup the information contained in the disk drive. Thus, the risk of losing data due to a disk failure is averted.

While the particular DEVICE AND METHOD FOR MONITORING LUBRICANT WITHIN A DISK DRIVE as herein shown and described in detail is fully capable of attaining the above-described objects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it is to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

We claim:

1. A disk drive comprising:
   at least one magnetic disk and at least one transducer head to communicate with the magnetic disk;
   a lubricant reservoir packet with lubricant, the reservoir packet fitted with a lubricant reservoir transducer; and
   a controller for measuring an electrical characteristic associated with the lubricant reservoir transducer to monitor the lubricant level in the reservoir packet.

2. The disk drive of claim 1, wherein the electrical characteristic is a capacitance of the lubricant reservoir packet.

3. The disk drive of claim 1, wherein the electrical characteristic is a conductivity of the lubricant reservoir packet.

4. The disk drive of claim 1, wherein the lubricant reservoir transducer comprises:
   a first screen; and
   a second screen, the reservoir packet being disposed there between.

5. The disk drive of claim 1, wherein the lubricant reservoir transducer comprises:
   at least one plate placed proximal to the housing, the reservoir packet being disposed between the housing and the plate.

6. The disk drive of claim 5, wherein the plate is formed with a plurality of holes.

7. The disk drive of claim 1, wherein the lubricant reservoir transducer comprises:
   at least one crystal oscillator; and
   a thin-film strip disposed within the reservoir packet, the thin-film strip communicating lubricant to the crystal oscillator.

8. The disk drive of claim 1, wherein the controller sends a signal to an output device when the lubricant reservoir packet is nearly empty.

9. A method for monitoring lubricant within a disk drive comprising;
   providing a lubricant reservoir packet;
   disposing a lubricant reservoir transducer in contact with the lubricant reservoir packet; and
   measuring an electrical characteristic of the lubricant reservoir packet.

10. The method of claim 9, further comprising;
    sending a warning signal to an output device, at least partially based on the electrical characteristic.

11. The method of claim 9, further comprising;
    shutting down the disk drive, at least partially based on the electrical characteristic.

12. The method of claim 9, further comprising;
    backing up data stored on the disk drive, at least partially based on the electrical characteristic.

13. The method of claim 9, wherein the electrical characteristic is a capacitance of the lubricant reservoir packet.

14. The method of claim 9, wherein the electrical characteristic is a conductivity of the lubricant reservoir packet.

15. The method of claim 9, wherein the lubricant reservoir transducer comprises:
    a first screen; and
    a second screen, the lubricant reservoir packet being disposed there between.

16. The method of claim 9, wherein the lubricant reservoir transducer comprises:
    at least one plate placed proximal to the housing, the reservoir packet being disposed between the housing and the plate.

17. The method of claim 16, wherein the plate is formed with a plurality of holes.

18. The method of claim 9, wherein the lubricant reservoir transducer comprises:
    at least one crystal oscillator; and
    a thin-film strip disposed within the reservoir packet, the thin-film strip communicating lubricant to the crystal oscillator.

19. A method for monitoring lubricant within a disk drive comprising the acts of:
    measuring an electrical characteristic of a lubricant reservoir packet when it is full of lubricant and establishing an initial value of the electrical characteristic, the packet being in communication with the disk drive;
    determining when the electrical characteristic falls below a predetermined percentage of the initial value of the electric characteristic; and
    when the electrical characteristic falls below the predetermined percentage of the initial value, generating a warning signal based thereon.

20. The method of claim 19, further comprising;
    sending the warning signal to an output device.

21. The method of claim 19, further comprising;
    shutting down the disk drive, at least partially based on the electrical characteristic.

22. The method of claim 19, further comprising;
    backing up data stored on the disk drive, at least partially based on the electrical characteristic.

23. The method of claim 19, wherein the electrical characteristic is a capacitance of the lubricant reservoir packet.

24. The method of claim 19, wherein the electrical characteristic is a conductivity of the lubricant reservoir packet.

* * * * *